United States Patent
Lundgren et al.

[11] Patent Number: 6,018,603
[45] Date of Patent: Jan. 25, 2000

[54] OPTICAL DEMULTIPLEXING/ MULTIPLEXING DEVICE HAVING A WAVELENGTH DEPENDENT ELEMENT

[76] Inventors: Kent R. Lundgren, 402 - 80 Sandcastle Drive, Nepean, Ontario, Canada, K2H 9E7; Paul Colbourne, 45D Woodfield Drive, Nepean, Ontario, Canada, K2G 3Y6

[21] Appl. No.: 08/924,656

[22] Filed: Sep. 5, 1997

[51] Int. Cl.[7] .................................................. G02B 6/32
[52] U.S. Cl. ................................. 385/33; 385/34; 385/46
[58] Field of Search .................................... 359/124, 131; 385/33, 34, 35, 46

[56] References Cited

U.S. PATENT DOCUMENTS

| | | | |
|---|---|---|---|
| 4,479,697 | 10/1984 | Kapany et al. | 350/96.18 |
| 4,735,478 | 4/1988 | Hily et al. | 350/96.16 |
| 5,818,221 | 10/1998 | Baruch | 324/175 |

FOREIGN PATENT DOCUMENTS

| | | | |
|---|---|---|---|
| 0 859 249 A1 | 8/1998 | European Pat. Off. | G02B 6/293 |

OTHER PUBLICATIONS

A Six–Channel Wavelength Multiplexer and Demultiplexer For Single Mode Systems Lipson, Minford, Murphy, Rice, Linke, Harvey Journal of Lightwave Technology, vol. LT–3, No. 5, Oct. 1985.

Narow–band ten–channel optical multiplexer and demultiplexer using a Fourier diffraction grating Lida, Asakura, Eda, Hagiwara Applied Optics Jul. 20, 1992, vol. 31. No. 20 pp. 4051–4057.

32 Channel WDM Multiplexer with 1 nm Channel Spacing and 0.7 nm Bandwidth D.R. Wisely, British Telecom Research Laboratories Jan. 21, 1991.

*Primary Examiner*—Hung N. Ngo
*Attorney, Agent, or Firm*—Neil Teitelbaum & Associates

[57] ABSTRACT

A device capable of demultiplexing or multiplexing optical signals includes a wavelength dependent element for separating an input beam into sub-beams of light in accordance with their wavelength. Precisely spaced optical fibers are disposed to receive at least some of the sub-beams of light; a focusing lens is disposed between the wavelength dependent element and the optical fibers for focusing the sub-beams at ends of the optical fibers. A rod-like GRIN lens for correcting for an offset in the focal length of the focusing lens is placed between the focusing lens and the optical fibers. The GRIN lens can be polished to change its length in order to correct for the offset in focal length of the focusing lens.

13 Claims, 3 Drawing Sheets

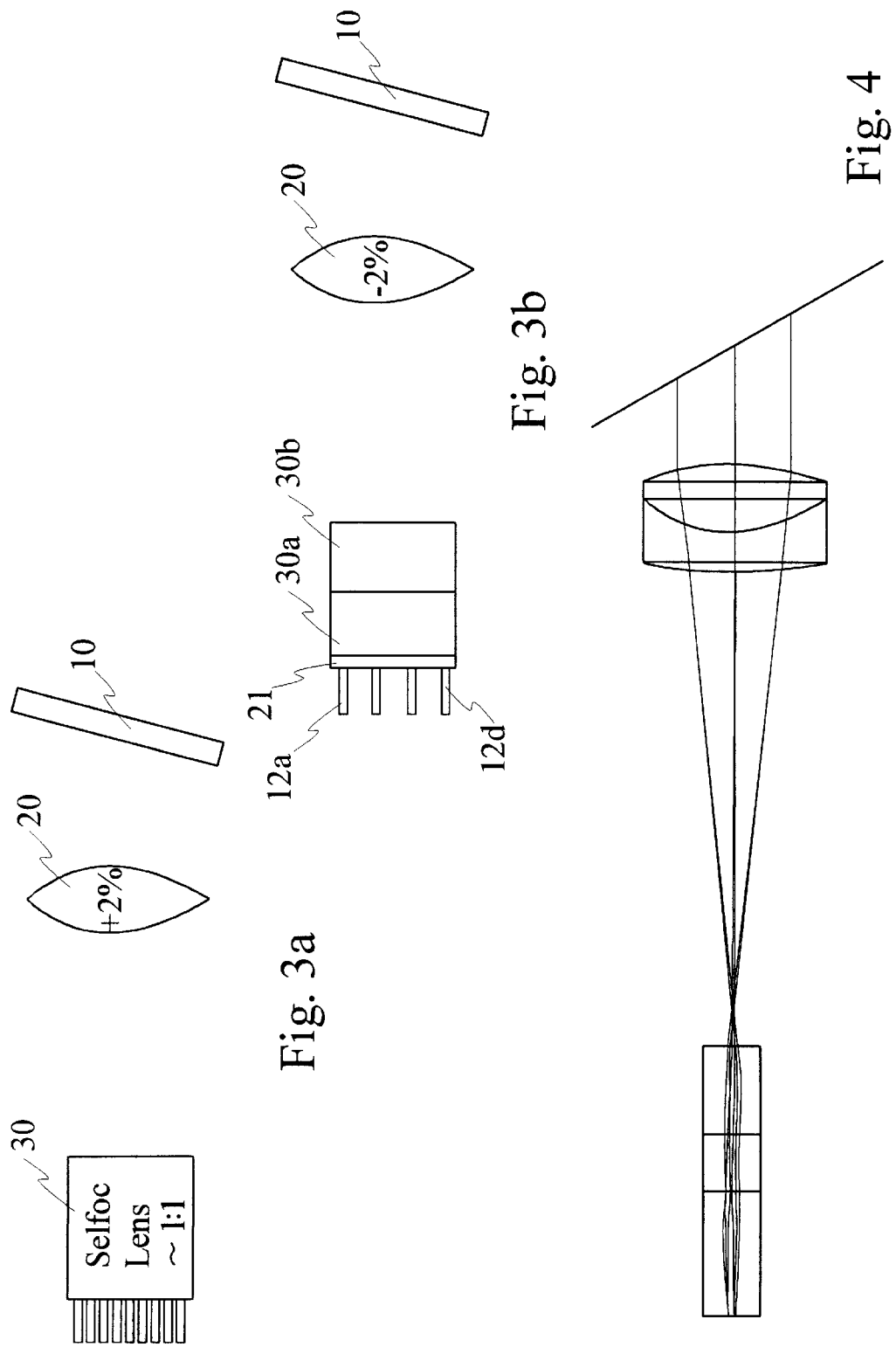

OPTICAL DEMULTIPLEXING/MULTIPLEXING DEVICE HAVING A WAVELENGTH DEPENDENT ELEMENT

FIELD OF THE INVENTION

This invention relates generally to an optical demultiplexor/multiplexor and more specifically an optical demultiplexor that uses a wavelength dependent element to separate an input beam into a plurality of sub-beams having differing wavelengths.

BACKGROUND OF THE INVENTION

In wavelength division multiplexed optical communication systems, many different optical wavelength carriers provide independent communication channels in a single optical fiber. Future computation and communication systems place ever-increasing demands upon communication link bandwidth. It is generally known that optical fibers offer much higher bandwidth than conventional coaxial communications; furthermore a single optical channel in a fiber waveguide uses a microscopically small fraction of the available bandwidth of the fiber (typically a few GHz out of several tens of THz). By transmitting several channels at different optical wavelengths into an fiber (i.e., wavelength division multiplexing, or WDM), this bandwidth may be more efficiently utilized.

There have been many attempts to develop a compact, high-resolution waveguide demultiplexor or spectrometer for application in areas such as spectroscopy, optical networks and optical links and more particularly optical communication systems. Such a demultiplexor can be extremely critical in wavelength division multiplexing (WDM) links. In these links or networks, each channel is assigned a distinct and unique wavelength for data transmission. Thus, the optical fiber that connects channels in a WDM network carries many discrete wavelength channels and a particular wavelength is selected before the data is received. The data reception can be achieved by combining a wavelength demultiplexor, photodetectors and electronic selection circuitries. In WDM links, many wavelengths are multiplexed and transmitted through a single optical fiber to increase the capacity of the fiber. The receiver must demultiplex the many wavelengths and select the proper channel for reception. In these applications, the requirements on the wavelength demultiplexor are typically: an optical bandwidth >30 nm, a wavelength resolution of a few angstroms, polarization insensitivity, compactness, low loss, low crosstalk, and a low manufacturing cost.

At present, there are many known methods of selecting particular wavelengths, however, none are ideal for the applications outlined above.

Techniques for multiplexing and demultiplexing between a single optical fiber comprising the multiplexed channel and plural optical fibers comprising the plural demultiplexed channels are described in various U.S. patents. For example, multiplexing/demultiplexing with birefringent elements is disclosed in U.S. Pat. Nos. 4,744,075 and 4,745,991. Multiplexing/demultiplexing using optical bandpass filters (such as a resonant cavity) is disclosed in U.S. Pat. Nos. 4,707,064 and 5,111,519. Multiplexing/demultiplexing with interference filters is disclosed in U.S. Pat. Nos. 4,474,424 and 4,630,255 and 4,735,478. Multiplexing/demultiplexing using a prism is disclosed in U.S. Pat. No. 4,335,933. U.S. Pat. No. 4,740,951 teaches a complex sequence of cascaded gratings to demultiplex plural optical signals. U.S. Pat. Nos. 4,756,587 and 4,989,937 and 4,690,489 disclose optical coupling between adjacent waveguides to achieve a demultiplexing function. A similar technique is disclosed in U.S. Pat. No. 4,900,118. Although some of these techniques are better than others, there is a need for a system using grating elements that is relatively inexpensive to manufacture and that is provides reasonable precision.

Wavelength dependent optical elements such as diffraction gratings, for example, an echellette grating, have been known for many years to produce a high-resolution spectrum where the wavelength is a function of the diffracted angle. Thus a single grating can demultiplex many wavelengths. When an incident beam comprising a plurality of wavelengths of light is incident upon a bulk diffraction grating, the light is diffracted by the grating and is separated into sub-beams that can be focused by a lens and received by a plurality of waveguides or detectors. However, providing a grating system wherein an array of optical waveguides is precisely positioned a predetermined distance from the focusing lens to capture adjacent spaced wavelength channels, is not without some difficulties.

The array of optical waveguides must be spaced precisely having a predetermined spacing in order to capture light of a particular set of wavelengths (channels). This spacing corresponds to the spacing of the sub-beams, which are produced by the diffraction grating and focused by the focusing lens, and is determined by the line density of the diffraction grating and the focal length of the focusing lens. If the spacing between adjacent waveguides is too large or too small, waveguides designed to couple with and receive particular wavelengths may couple with other wavelengths or may not couple with an intended wavelength efficiently.

Typically, lenses used in commercial applications have a focal-length tolerance of approximately ±2% or greater. The cost of using focusing lenses that are within a smaller tolerance, for example guaranteed to be within ±1%, adds significant cost to the manufactured device that some customers are not willing to pay. However, it is also impractical to manufacture waveguide arrays such that each array has unique waveguide spacing designed to match the beam spacing produced by a particular lens.

Furthermore, to efficiently couple light, the waveguide must be at an optimum distance from the focusing lens, which is determined by the focal length of the lens.

These difficulties can be addressed by incorporating an imaging lens which provides transverse magnification to correct the mismatch between the sub-beam spacing and the waveguide spacing and also provides a convenient point of attachment for the waveguide array and a means to position the array at the optimal distance from the focusing lens. For example, if the focal length of the focusing lens is larger than the design value, then the sub-beams will be spaced farther apart than the waveguides. Therefore, the imaging lens would be made to provide a transverse magnification <1 so that the beam spacing is reduced to match the waveguide spacing.

It is therefore an object of this invention to provide a diffraction grating system for separating wavelengths of light wherein compensation is provided to lessen the effects of variation in focal length of a focusing lens.

It is a further object of the invention, to provide a means and method for providing fine adjusting focus control in a wavelength dependent optical system.

It is a further object of the invention to provide a compact, manufacturable wavelength division multiplexing (WDM) device for telecommunications purposes and for other applications that is relatively easy and inexpensive to manufacture.

In accordance with the invention, there is provided a demultiplexing/multiplexing device having a wavelength dependent element for separating an input beam into sub-beams of light in accordance with their wavelength; a plurality of waveguide means having a spacing therebetween for receiving at least some of said sub-beams; a focusing lens disposed between the wavelength dependent element and the plurality of waveguides for focusing said sub-beams a predetermined distance from the wavelength dependent element; and, an imaging lens disposed between the plurality of waveguides and the focusing lens to compensate for an offset in the focal length of the focusing lens.

In accordance with the invention there is provided, a demultiplexing/multiplexing device having a wavelength dependent element for separating an input beam into sub-beams of light in accordance with their wavelength;

a plurality of waveguide means having a predetermined spacing therebetween for receiving at least some of said sub-beams;

a focusing lens disposed between the wavelength dependent element and the plurality of waveguides, for focusing said sub-beams a substantially a predetermined distance, from the wavelength dependent element; and, an imaging lens for correcting for an offset in the focal length of the focusing lens.

In one particular embodiment, the imaging lens is nearly a one-to-one imaging lens

BRIEF DESCRIPTION OF THE DRAWINGS

Exemplary embodiments of the invention will now be described in conjunction with the drawings, in which:

FIG. 3a is a top view (not to scale) of an optical system in accordance with the invention, including a compensating GRIN lens that provides nearly 1:1 imaging with no spacer between the waveguides and the lens;

FIG. 3b is a top view (not to scale) of an optical system in accordance with the invention, including a compensating GRIN lens that provides nearly 1:1 imaging with a spacer between the waveguides and the lens;

FIG. 4 is a diagram illustrating an alternative embodiment of an optical system in accordance with the invention wherein a pair of spaced GRIN lenses are used;

DETAILED DESCRIPTION

Figure 1:
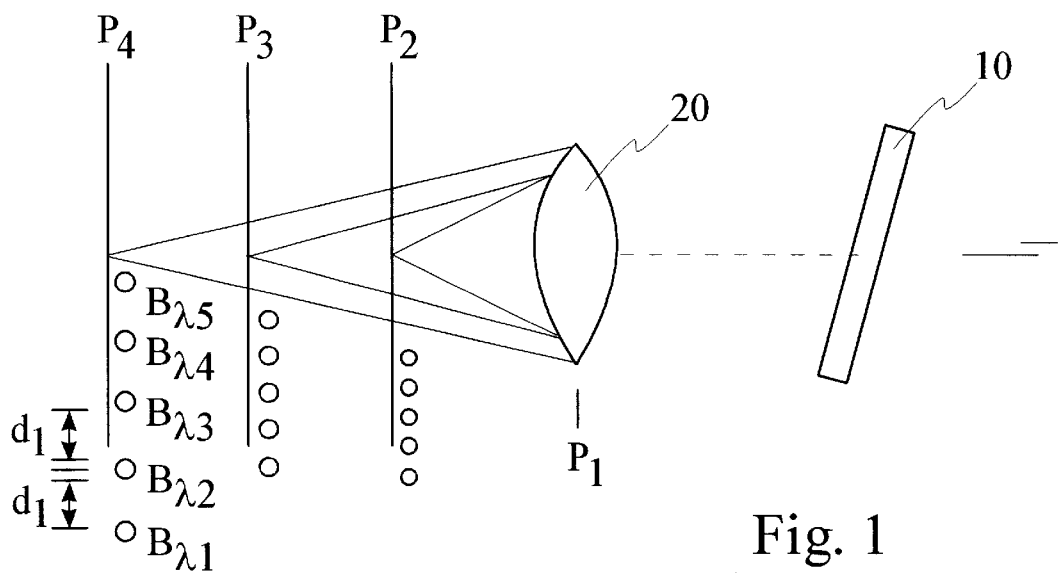
FIG. 1 is a diagram of a bulk grating system illustrating channel separation at a plurality of distances from a focusing lens.

Referring now to FIG. 1, a prior art optical demultiplexing arrangement is shown wherein a bulk grating element 10 is shown juxtaposed from a focusing lens 20, which focuses sub-beams of light corresponding to a fixed set of wavelengths. FIG. 1 illustrates the following: a lens with a smaller focal length causes the focused sub-beams to be more closely spaced, whereas a lens with a larger focal length causes the focused sub-beams to be spaced farther apart. Thus, in order to capture demultiplexed sub-beams of light $B\lambda 1 \ldots B\lambda 5$ (shown offset from the optical axis of the lens 20, for the purposes of illustration only), waveguides with a physical spacing of d1 must be used if the lens has the larger focal length shown.

Figure 2:
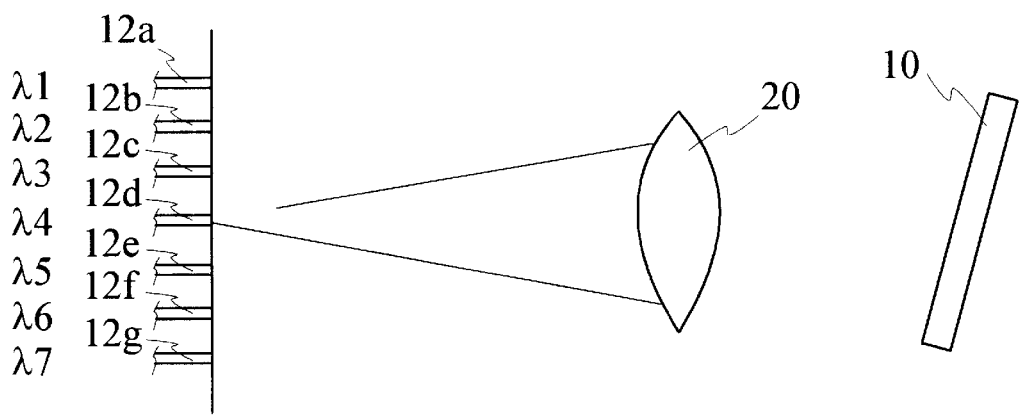
FIG. 2 is a diagram of a bulk grating system including a plurality of light receiving waveguides spaced a predetermined distance from a focusing lens.

In FIG. 2, a similar arrangement is shown, wherein waveguides 12a to 12g are shown, for receiving wavelengths of light $\lambda 1 \ldots \lambda 7$ respectively.

FIG. 1, illustrates that as the focal length of the lens 20 is varied, the plane at which light is focused is varied and the channel separation at the plane where light is focused varies.

Since a telecommunications standard defines a particular required channel spacing within predetermined limits, and it is desired to efficiently couple channelized light into the waveguides 12a . . . 12g, the geometry of the system shown in FIG. 2 is somewhat intolerant to a variation in the focal length of the lens 20. As the focal length changes, the channel separation changes.

Currently, manufacturers of demultiplexers of this type use lenses that are guaranteed to have a focal length within predetermined limits. For example, commercially available lenses suitable for use in demultiplexers of this type are obtainable have a tolerance of ±2%.

FIG. 3a, in accordance with an embodiment of this invention shows a demultiplexing device similar to that of FIGS. 1 and 2, wherein a correction or compensating GRIN lens 30 is used to correct a focusing lens 10 having an offset of, for example +2%. The compensating lens 30 is preferably a cylindrical graded index (GRIN) lens that is slightly shorter than a half pitch 1:1 GRIN imaging lens. A half pitch lens can be polished as is required to a suitable length <0.5 pitch to compensate for the +2% offset in the focusing lens 20.

FIG. 3b illustrates a configuration wherein a focusing lens having an offset of about −2% is provided. In this embodiment, a spacer 21 is placed between the waveguides and the GRIN lenses 30a and 30b in order to provide the correct magnification to compensate for the −2% offset in the focusing lens 20.

The graded index lens is one of the most ubiquitous building blocks used in the design and manufacture of optical elements. Lenses of this type are produced under the trade name "SELFOC"; the mark is registered in Japan and owned by the Nippon Sheet Glass Co. Ltd. GRIN lenses in combination with other optical elements are used in the manufacture of WDM devices, optical couplers, circulators, isolators, and other devices. The use of a GRIN lens in this invention provides a number of advantages over other conventional lenses. For example, GRIN lenses are relatively inexpensive, compact, and furthermore have flat end faces. This is particularly advantageous in this instance, as the lenses may be easily polished to lessen their length and consequently their pitch. The flat end face also provides a convenient point of attachment for the waveguide array, allowing the array to be cemented directly to the GRIN lens. Also, the cylindrical shape of a GRIN lens allows it to be positioned easily by allowing it to slide in a cylindrical hole. Thus, the GRIN lens can be moved parallel to its axis until it is located at the optimal distance from the focusing lens for coupling light into the waveguides and then it can be cemented in place.

Turning again to FIG. 3b, a demultiplexing system is shown wherein a focusing lens 20 has a focal length of −2% of the ideal length for focusing upon the array of optical fibres 12a . . . 12d.

Alternatively, but less preferably, an optically equivalent GRIN lens arrangement is shown wherein two back to back substantially quarter pitch GRIN lenses having their collimating ends coupled, such that a substantially 1:1 imaging is provided for an image or beam at an end of the lens.

Alternatively, and more preferably, the lens shown in FIG. 3a in the form of a substantially half pitch lens can be used as a correction lens.

Figure 5:
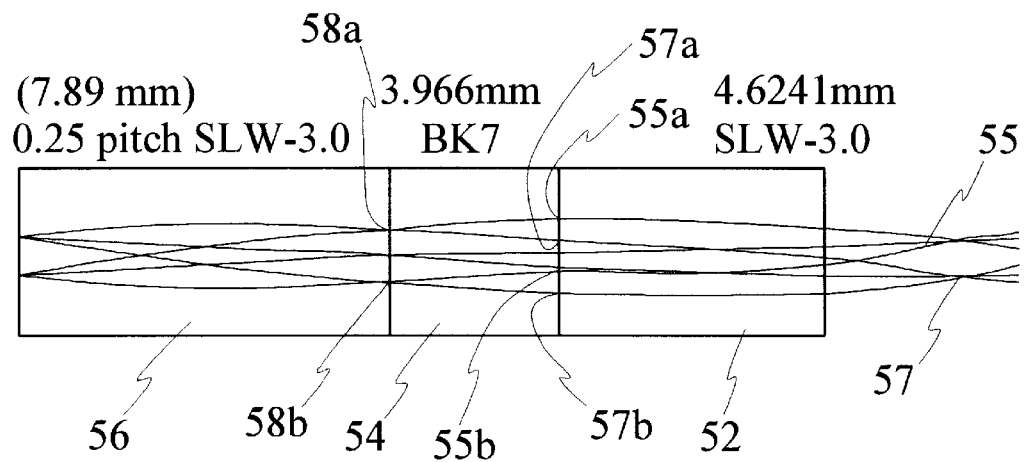
FIG. 5 is a detailed side view of the spaced GRIN lenses shown in FIG. 4 including a transparent spacer element in accordance with the invention; and, FIG. 6 is a detailed side view of a GRIN lens wherein coupling loss occurs at a leftmost end of the lens due to the exit angle of the beams.

Alternatively, a compound lens consisting of two GRIN lenses with a glass spacer cemented between them can be used as a correction lens. This arrangement may be preferable in cases where the required transverse magnification is substantially different from 1. This arrangement is shown in FIGS. 4 and 5. Providing the spacer layer allows for optimum coupling of the focused light at the end face of the GRIN lens 56 to be coupled with the fibre array (not shown). When a collimated beam of light is launched into a substantially collimating end face of a 0.25 pitch GRIN lens centered about the optical axis of the GRIN lens, the focused beam at the opposite focusing end of the lens is parallel with the optical axis of the lens. This condition is preferable in order to have efficient coupling of light from the focusing end face to adjacent optical waveguides. Conversely, when a collimated beam of light is launched into the collimating end face of a GRIN lens, offset from the optical axis of the GRIN lens, the focused beam at the opposite focusing end of the lens will exit and be angled and at an incline with respect to the optical axis of the lens. This condition adversely effects the coupling of light from the lens to adjacent waveguides and signal light loss occurs.

Figure 6:
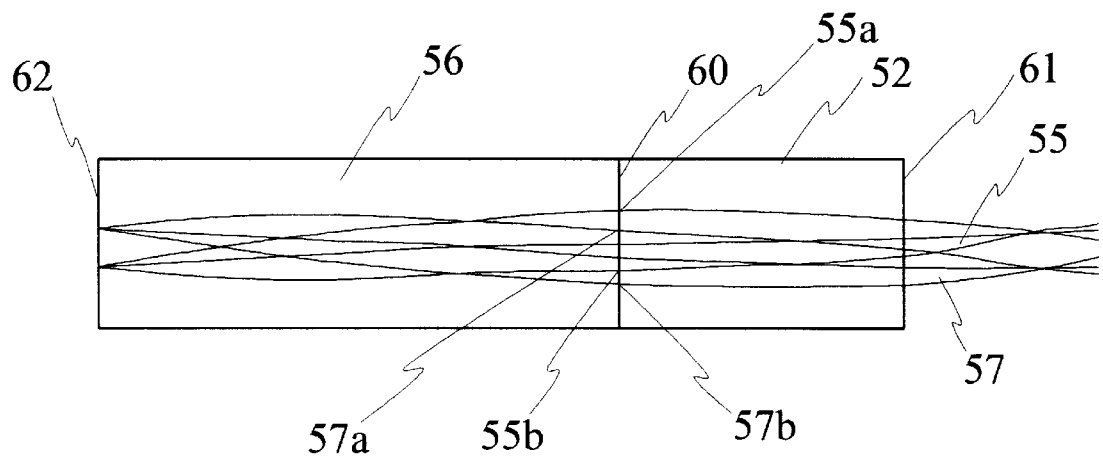

This is illustrated in FIG. 6 where it is shown that light rays at the outer diameter of the beam 55 at the collimating end face of the lens 52 are coincident with points 55a and 55b. Similarly it can be seen that light rays along the outer diameter of the beam 57 at the collimating end face of the lens 52 are coincident with points 57a and 55b, wherein the two beams are partially overlapping but substantially offset from one another. Advantageously, in FIG. 5, the spacer element 54 is designed to ensure that the beams 55 and 57 completely overlap each other as they enter the lens 56 rather than being offset. FIG. 5 illustrates that the central ray of each beam exits the focusing end face parallel to the optical axis of the GRIN lens. In FIG. 6, the spacer element is absent, and a single GRIN lens 60 is used; the beam exiting the end face 62, exits at an incline to the optical axis of the lens, and coupling efficiency is lessened.

Of course, numerous other embodiments may be envisaged, without departing from the spirit and scope of the invention.

For example, the device shown in the previous figures can be used as a multiplexor or a demultiplexor.

What is claimed is:

1. A demultiplexing or multiplexing device having a wavelength dependent element for separating an input beam into sub-beams of light in accordance with their wavelength;
   a plurality of waveguide means having a predetermined spacing therebetween for receiving at least some of said sub-beams;
   a focusing lens disposed between the wavelength dependent element and the plurality of waveguides, for focusing said sub-beams a substantially a predetermined distance from the wavelength dependent element; and,
   an imaging lens for reshaping a beam passing therethrough and correcting for an offset in the focal length of the focusing lens.

2. A demultiplexing or multiplexing device having a wavelength dependent element for separating an input beam into sub-beams of light in accordance with their wavelength;
   a plurality of waveguide means having a predetermined spacing therebetween for receiving at least some of said sub-beams;
   a focusing lens disposed between the wavelength dependent element and the plurality of waveguides, for focusing said sub-beams a substantially a predetermined distance from the wavelength dependent element; and,
   an imaging lens for correcting for an offset in the focal length of the focusing lens, wherein the imaging lens is a rod-like GRIN lens.

3. A demultiplexing or multiplexing device as defined in claim 2, wherein the imaging lens is a substantially x:1 imaging lens, wherein x is less than or greater than 1.

4. A demultiplexing or multiplexing device having a wavelength dependent element for separating an input beam into sub-beams of light in accordance with their wavelength;
   a plurality of waveguide means having a predetermined spacing therebetween for receiving at least some of said sub-beams;
   a focusing lens disposed between the wavelength dependent element and the plurality of waveguides, for focusing said sub-beams a substantially a predetermined distance from the wavelength dependent element; and,
   an imaging lens for correcting for an offset in the focal length of the focusing lens, wherein the imaging lens comprises two GRIN lenses.

5. A demultiplexing or multiplexing device as defined in claim 4, wherein the imaging lenses have at least substantially collimating lenses and where collimating ends of the lenses are facing one another.

6. A demultiplexing or multiplexing device as defined in claim 5, including transparent spacer means disposed between the GRIN lenses.

7. In an optical demultiplexing or multiplexing circuit having a wavelength dependent element for separating an input beam into sub-beams of light in accordance with their wavelength having a plurality of ports having a predetermined spacing therebetween for receiving at least some of said sub-beams; and a focusing lens disposed between the wavelength dependent element and the plurality of ports, for focusing said sub-beams a substantially a predetermined distance, from the wavelength dependent element, the improvement comprising, a rod-like GRIN lens in the path of sub-beams and the ports for correcting an offset in the focal length of the focusing lens.

8. An optical demultiplexing or multiplexing device as defined in claim 7 wherein the rod-like GRIN lens is an imaging lens having a transverse magnification greater than or less than 1.

9. An optical demultiplexing or multiplexing device as defined in claim 7, wherein the rod-like GRIN lens is an imaging lens having a magnification of nearly 1.

10. An optical demultiplexing or multiplexing device as defined in claim 7, further comprising a second GRIN lens adjacent the rod-like GRIN lens.

11. An optical demultiplexing or multiplexing device as defined in claim 10 including a transparent spacer element disposed between the rod-like GRIN lens and the second GRIN lens, for aligning beams of light passing therethrough at an end face with an optical axis of one of the GRIN lenses.

12. A method of correcting for an offset in a focusing lens, comprising the steps of:

provinding a rod-like GRIN lens;

polishing and end of the GRIN lens to yield a magnification not equal to 1;

optically coupling the polished GRIN lens with the focusing lens so as to receive light at the GRIN lens when light is directed through an end of the focusing lens.

13. A method as defined in claim 12, wherein the focusing lens is used within an optical demultiplexing system, the method further providing the step of coupling the GRIN lens and the focusing lens with a wavelength dependent element for separating an input beam into sub-beams of light in accordance with their wavelength, for demultiplexing light.

* * * * *